United States Patent [19]

Di Giovanni et al.

[11] 4,427,112
[45] Jan. 24, 1984

[54] SERVICE LINE INTERIOR BY-PASS KIT

[76] Inventors: Bernard A. Di Giovanni, 96 Davis Ave., Hauppauge, N.Y. 11787; Francisco J. Ciminiello, 21 Victor La., Woodbury, L. I., N.Y. 11797

[21] Appl. No.: 423,304

[22] Filed: Sep. 24, 1982

Related U.S. Application Data

[62] Division of Ser. No. 181,671, Aug. 27, 1980, which is a division of Ser. No. 955,990, Oct. 30, 1978, abandoned.

[51] Int. Cl.³ .............................................. B65D 69/00
[52] U.S. Cl. .................................... 206/223; 206/569; 206/582; 206/305; 138/90; 138/97; 138/98; 138/103; 138/178; 285/15; 285/55
[58] Field of Search ........................ 138/89, 90, 91, 97, 138/98, 103, 178; 285/15, 55; 73/40.5 R, 49.1, 49.8; 48/193, 195; 166/179; 405/169, 170; 206/223, 569, 582, 244, 303, 305, 407, 525, 526, 527, 524.1

[56] References Cited

U.S. PATENT DOCUMENTS

| | | | |
|---|---|---|---|
| 2,164,195 | 6/1939 | Waltermire | 138/90 X |
| 2,241,526 | 5/1941 | Rosenkranz | 138/90 |
| 2,731,041 | 6/1952 | Mueller et al. | 138/97 |
| 2,756,779 | 7/1956 | Tratzik et al. | 138/97 |
| 2,784,627 | 3/1957 | Mueller et al. | 138/97 X |
| 3,194,466 | 7/1965 | Davis | 138/90 X |
| 3,568,721 | 3/1971 | Ross et al. | 138/97 |
| 3,700,625 | 10/1972 | Dufour et al. | 285/15 |
| 3,817,086 | 6/1974 | Dorgebray et al. | 138/90 X |
| 4,166,479 | 9/1979 | Cleavenger | 138/90 X |

Primary Examiner—James E. Bryant, III
Attorney, Agent, or Firm—Brooks, Haidt, Haffner & Delahunty

[57] ABSTRACT

Interior by-pass for underground gas service line is installed from building basement without need for excavation, and has a tightenable adapter attached on each end of the by-pass tubing to connect and seal the tubing to the interior periphery of the service line. Each adapter provides a pair of spaced-apart expanded sealing gaskets between the tubing and the service line, and a gas-leakage passage extending from the interior of the tubular adapter to the exterior spacing between the adapter gasket pair. Temporary gas-tight plugs are provided at respective locations between each leakage passage and the adjacent end of the by-pass tubing, and compressed natural gas test-pressure is applied within the tubing. Via both of the referred to leakage passages, the test pressure is exerted against all of the gasket seals to confirm gas-tightness thereof. Techniques are described for installing each adapter and the by-pass tubing, working only from the service end of the line, including installation of the service end adapter prior to the blind end adapter; the use of temporary gas-inflation bags to permit installation of the by-pass in the face of service gas flow; and structure on each adapter to fully expand the innermost gasket of each pair before the outermost gasket is expanded.

6 Claims, 14 Drawing Figures

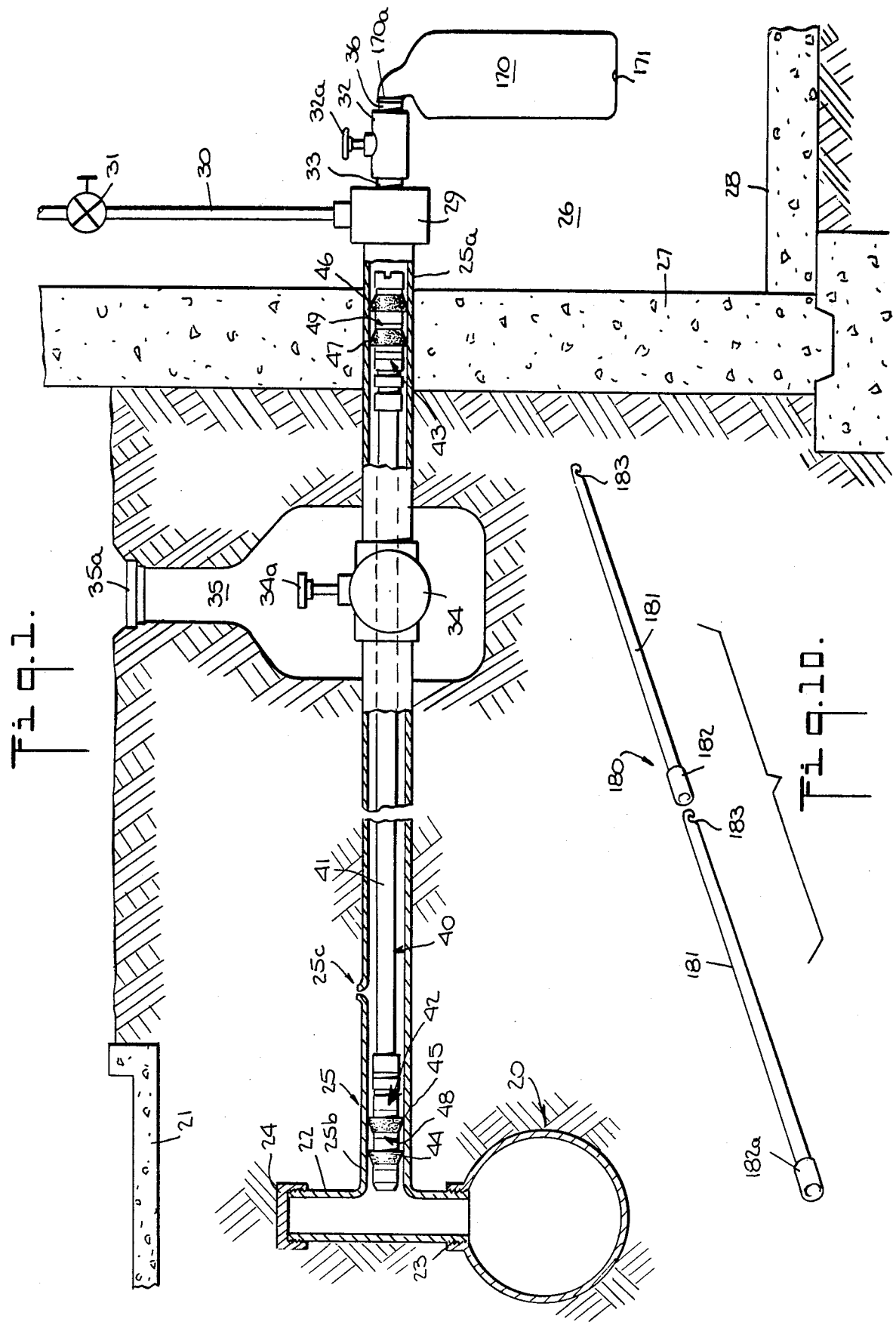

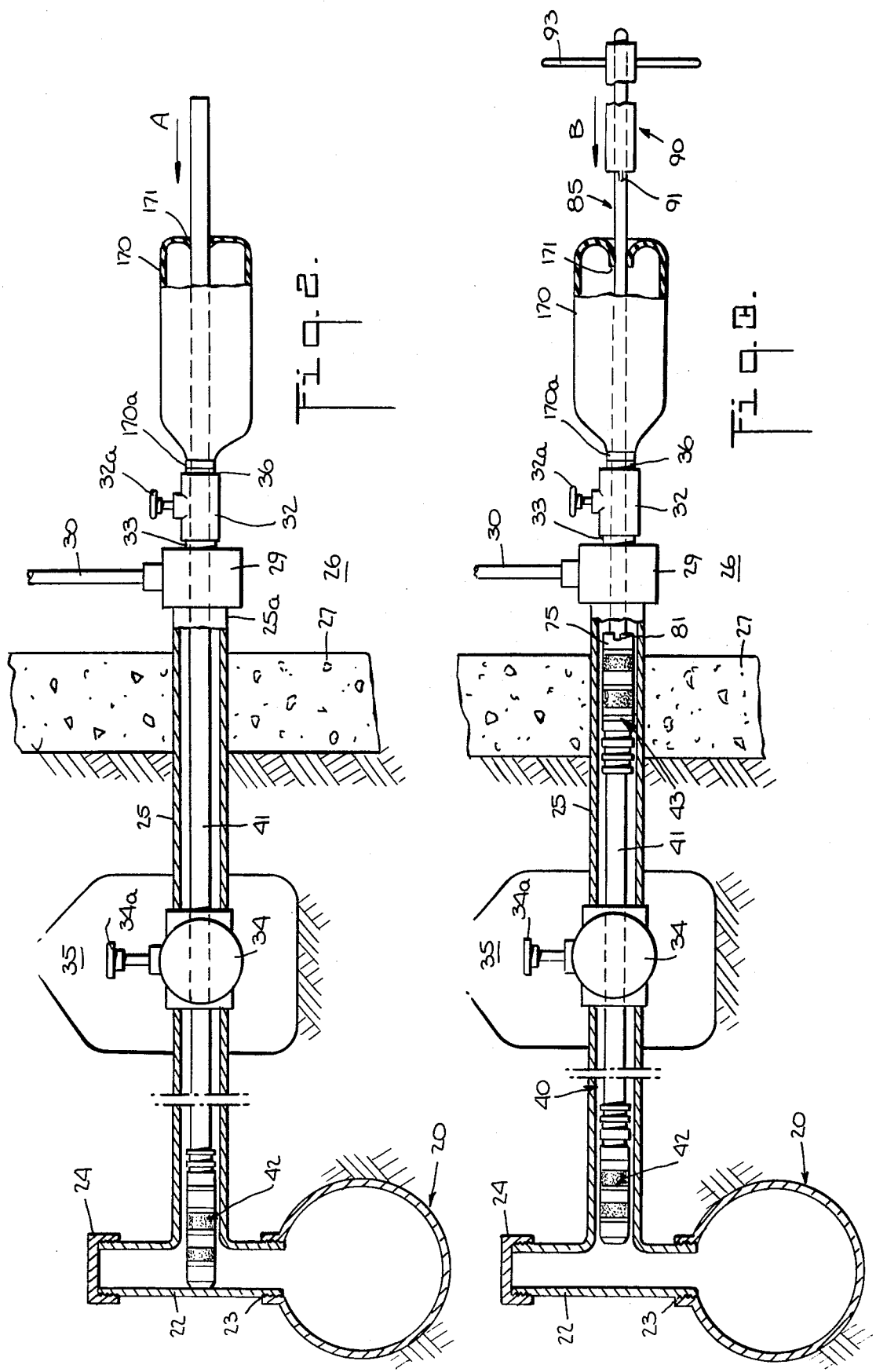

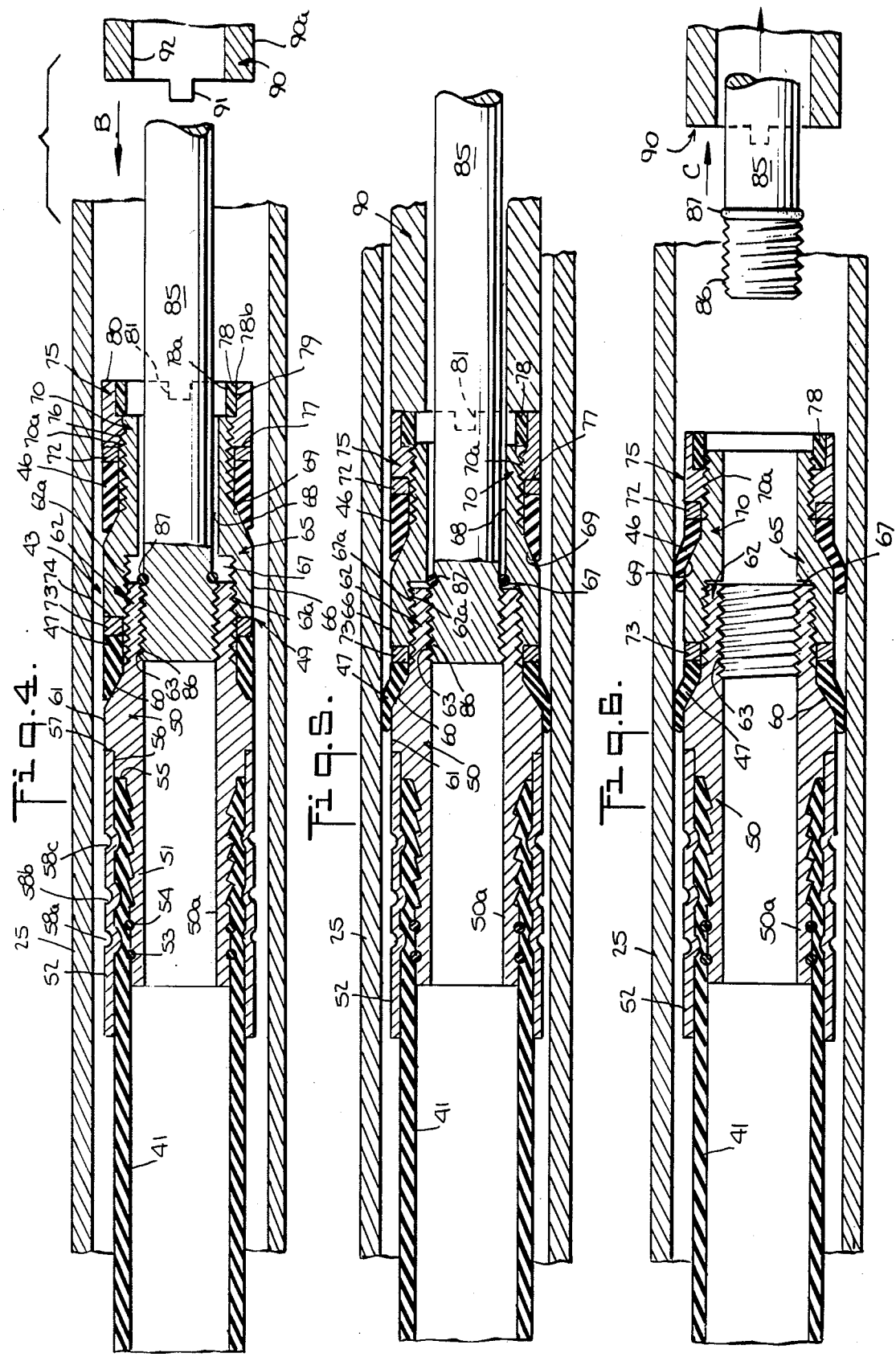

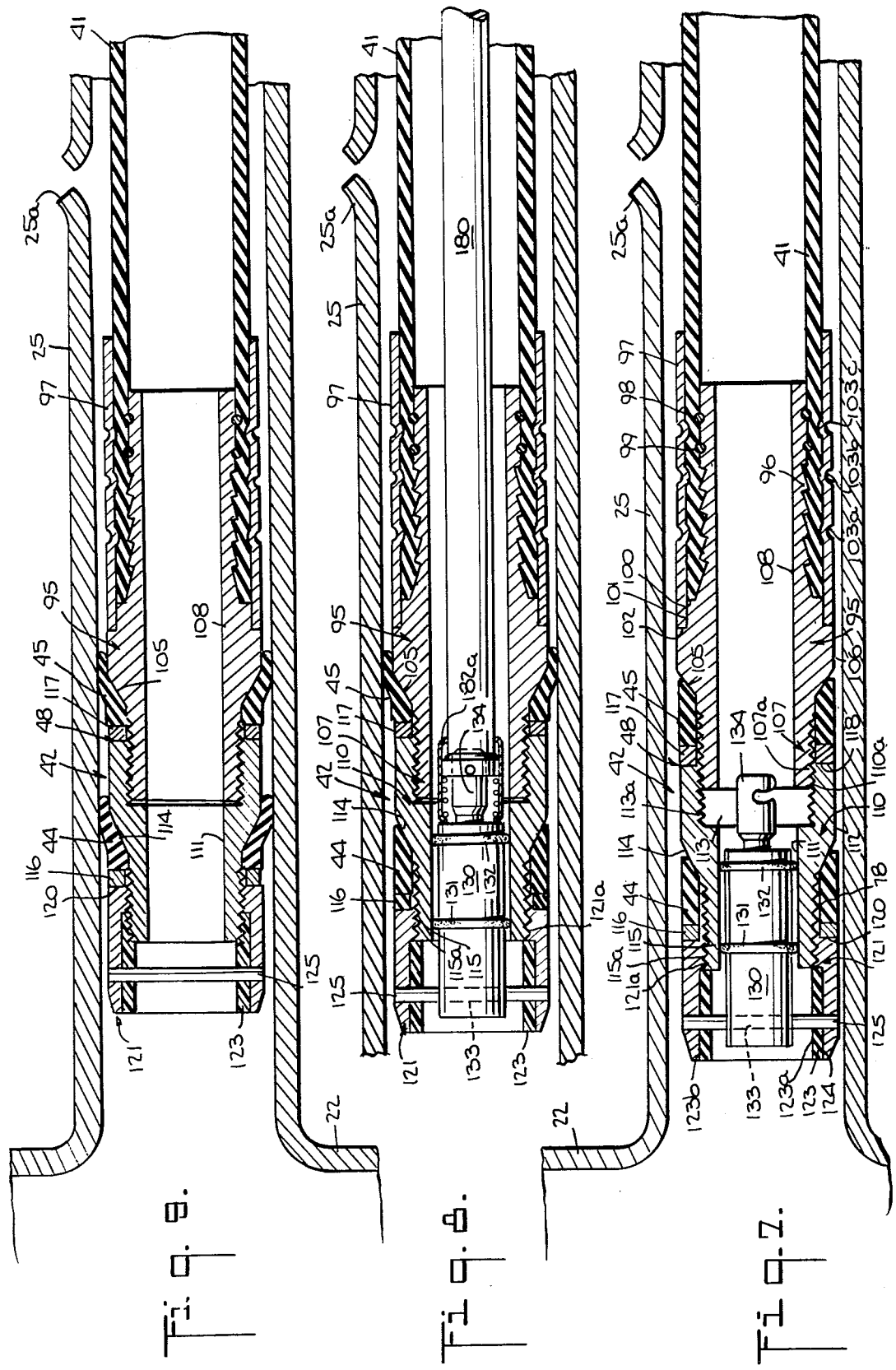

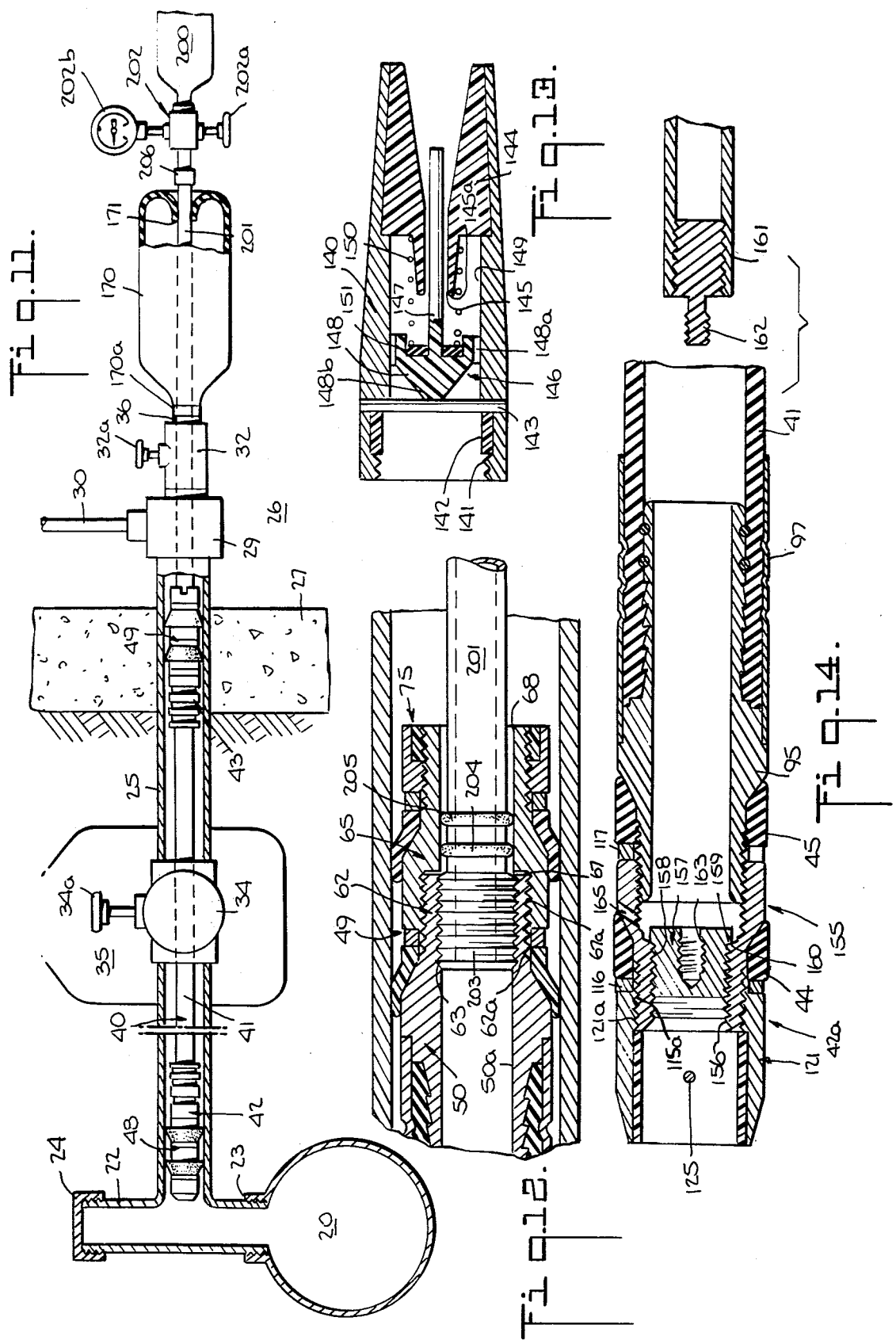

SERVICE LINE INTERIOR BY-PASS KIT

This is a division of application Ser. No. 181,671, filed Aug. 27, 1980, which application Ser. No. 181,671 is a division of application Ser. No. 955,990, filed Oct. 30, 1978, abandoned.

FIELD OF INVENTION

This invention relates to techniques for rehabilitating lengths of leaky fluid-conducting conduits which are relatively inaccessible, such as underground utility service lines which conduct natural gas from a street main into the basement of a house or building. More particularly, the invention relates to methods and apparatus for installing a smaller diameter interior by-pass conduit within and along the length of an existing larger but deteriorated conduit to conduct the fluid normally conducted by the latter, thus to avoid any leak points.

Although the invention may have other uses, it was made during an attempt to devise a more effective way to install and test such an interior by-pass conduit within an underground gas service line without need for any ground excavation, and it will therefore be described in connection with such use.

BACKGROUND OF THE INVENTION AND THE PRIOR ART

A conventional buried distribution network of pipes for conducting natural or produced gas from a public utility throughout a city and into homes or buildings for heating purposes includes large diameter gas mains extending beneath and along the city streets, from each of which many smaller diameter gas service lines extend laterally, each for delivering the gas into a house or other building. In low pressure systems for delivering the gas at a pressure of about 6"-water column (0.25 p.s.i.g.) each such service line is usually made of from 1¼"-diameter to 2"-diameter or larger pipe, whereas in higher pressure systems (e.g., 48"-water column, or 2.0 p.s.i.g.) the diameter of the service line may be ½", or ¾", or larger. The service line extends some 25 to 50 feet underground from a tee connection on the top centerline of the gas main to and through the building wall, and into the basement. Ordinarily there is no manhole located at the main tee connection, so that the tee as well as the service line itself is inaccessible without excavation, being buried several feet under the paved street. The steel pipe of which the service line is made passes beneath any sidewalk, lawn, garden and the like, all being ground areas which are not intended to be disturbed. A curb valve, normally of the gate type and accessible by way of a street level valve box, may or may not be located within the service line to shut off gas glow when desired.

When because of breakage or corrosion one or more leaks develop in such a service line, a common repair technique is to install an internal conduit, usually made of metal or plastic tubing, to carry the gas past the leak points. The installation is usually made working mainly from the basement or service end of the line, and extends all the way to the main. Some street excavation has been required to reach the tee connection at the gas main, both to shut off the flow of gas from the main and to open the service line to make the required interior connection between the liner tubing and the service line adjacent to the main, thus to avoid replacement of the service line as would entail digging and trenching along much if not all of its length.

A common technique for connecting a plastic liner tubing at the street end of a conventional steel service line involves removal of a short section of the service line adjacent to the main, and substitution of a prefabricated steel pipe adapter section to which a length of the plastic liner pipe has already been permanently joined, as by a compression coupling formed integrally with the adapter section. In this procedure, after the required street excavation to locate the gas main tee connection, and after the flow of gas from the main has been stopped and the required length of the existing service line has been removed, the plastic liner pipe is fed through the service line from the building basement and its forward end is connected to the adapter section. The latter is then connected to the tee-fitting on the main. Having thus connected the liner conduit at the street end, the service end of the liner pipe is connected to the interior of the service line at the point where it projects into the basement through the building wall, and a variety of service heat adapters and techniques are known for doing so without any excavation adjacent to the building. Of course, before installing the liner the interior of the service line must be cleaned of dirt and scale by reaming as necessary, including possible reaming through any curb valve in the line.

In general, such interior by-pass installations requiring excavation at the gas main are known, and are shown for example in U.S. Pat. Nos. 2,268,263 (Newell et al) and 2,546,348 (Schuman). Similar installations which are intended to be made working solely from the basement or service head end of the service line, thus requiring no street excavation at all are disclosed for example in U.S. Pat. Nos. 2,731,041 (Mueller et al.); 2,756,779 (Tratzik et al.); and 2,829,675 (Mueller et al.), although in these patents only relatively short lengths of the liner pipe are described as extending only a short distance outwardly from the building wall rather than over the entire distance to the gas main as contemplated by the present invention. All of the foregoing as well as other patents, such as U.S. Pat. Nos. 2,487,939 (Norton); 2,641,491 (Mueller et al.); and 3,244,438, describe a variety of adapters for connecting and hermetically sealing the liner tubing to the service head end of the service line in such internal by-pass systems.

However, known by-pass arrangements which extend all the way from the building to the main are not generally believed to be effectively installed without any street excavation, and are therefore considered to be very costly in terms of the time, inconvenience and expense involved in such street excavation and in replacing the ground and its cover to its original condition. Regarding known types of interior by-pass installations which do not require street excavation, it is believed that, while they may be effective working with short lengths, they probably cannot be reliably installed where the length of by-pass tubing extends from the building to any location beyond the curb valve, which must be shut to cut off the flow of live gas from the main, because these installations in general are not easily or safely made in a service line in the face of a normal flow of gas, or cannot be tested for leaks.

In known types of interior by-pass installations in which the liner tubing is installed working solely from the basement end of the service line it is especially difficult to secure a fluid-tight seal at the "blind" end of the service line, and to confirm that an effective seal has been made at that end. In fact, in all previous types of installations which extend all the way to the main, an effective technique for leakage testing of the blind end liner seal, working solely from the building basement, has not been developed. Nor has any previous adapter sealing technique permitted effective simultaneous testing of the seals made at both ends of the line, to the end that both can be certified as meeting test standards established for such seals.

In addition, previous interior by-pass liner installations are usually required to be made using considerable care or skill, with attendant high cost due to the prolonged time involved in making and testing the installation. Of course, there is a commensurately long interruption in gas service to the building, resulting in other inconveniences.

SUMMARY OF THE INVENTION

Accordingly, it is intended by the present invention to overcome these difficulties by providing a method and means by which such interior by-pass tubing can be conveniently installed within the entire length of a gas service line extending from a building basement some 25-to 50-feet to the street main, working from only the basement or service head end of the line, yet with assurance that fluid-tight peripheral seals of the tubing against the interior of the existing conduit will be established at both ends of the tubing. Thus, no street excavation will be required at the location of the gas main, nor anywhere between the main and the building. Since the by-pass will extend beyond the location of any existing curb-valve in the line, as a corrollary to the avoidance of street excavation it is also intended by the invention to provide a method and means to effect such installation without any need for shutting off the flow of gas from the main, i.e., while the service line is "alive". It will also be noted that any existing curb valve may be subsequently closed to squeeze and flatten the plastic or soft metal liner tubing to shut off the flow of gas in an emergency. Of course, the installation procedure must also be safe, and not require unusual or hurried work techniques.

The fluid-tight seal made at each end of the tubing must be easily installed, and must be effective to meet test standards established by government agencies. For example, the Public Service Commission of the State of New York requires that such gas seals in low pressure lines (0.25 p.s.i.g.) be effective to prevent gas leakage at 50 p.s.i.g. exerted continuously for a period of fifteen minutes. The seals of the by-pass installation of the present invention are intended, and in fact have been found to pass such a leakage test.

Perhaps more importantly, the present invention provides a method and means to conveniently apply such a gas leakage test to the line, using compressed natural gas as a test medium, and to effectively monitor the test results so that the establishment of an effective seal at each end of the interior by-pass tubing can be certified. Moreover, the gas-tight effectiveness of the installation can be similarly tested in any future time when leakage is suspected.

The installation can be made rapidly, and therefore with considerable savings in the labor cost as compared with previously known similar installations, whether or not they required street excavation. Of course, the time, inconvenience and expense of repairing such otherwise required street excavation is entirely eliminated by the present invention, and the time of the gas service interruption is in any case substantially reduced.

It is also intended to provide a by-pass installation which may be used universally throughout a gas service system and in both high and low pressure lines, requiring only size variation of its component parts to adapt it for use in different diameter lines.

Briefly describing the invention, it employs an adapter attached at each end of the liner tubing as in known arrangements, but each adapter provides a pair of spaced-apart expanded gaskets, rather than a single expanded gasket, to connect and seal its end of the liner tubing within the service line, and a deliberately provided gas-leakage passage between the pair of expanded gaskets to permit gas flow from the interior of the liner (or, more accurately, from the interior of the adapter body as will be described) to the exterior of the liner tubing between the referred to pair of expanded gaskets. In addition, respective and temporary gas-tight plugs are installed beyond the deliberately provided gas leakage passages at the ends of the liner tubing (i.e., between each leakage passage and the adjacent liner end) so that, after the installation is completed, test pressure, usually compressed natural gas, can be applied to the interior of the liner from the building basement to test for leaks through the seals at both of its ends. During testing, the test pressure is transmitted interiorly of the liner and, via the gas leak passages, to the exterior of each adapter end connection, between the pair of expanded gaskets thereat and against the interior wall of the service line so as to be applied directly to the periphery of each gasket seal. If any gasket of the two pairs of expanded gaskets leaks, a slow drop in test pressure will be observed over a period of time. It will be noted that if but a single gasket were used at either end, its tightness of seal against the interior of the old service pipeline could not be tested using test pressure applied only to the interior of the liner. In contrast, the present invention permits test pressure to be applied directly and simultaneously from the interior of the liner to both of the exterior gasket seals formed in closely adjacent relation a each end of the line. The innermost gasket of each pair (i.e., that closest to the middle of the pipeline) must demonstrate that it is effectively sealed, otherwise loss of test pressure will occur through the existing steel service pipeline which is known to be leaky, and the outermost gasket of each pair (i.e., that which is adjacent to the end of the tubing) must also demonstrate its tightness to avoid loss of test pressure therethrough in the direction of the end of the tubing. If any of the four gasket seals leaks, the test pressure will drop.

The deliberate leakage aperture between each pair of sealing gaskets can be effected by drilling a hole through the steel body of the adapter connection or, alternatively and preferably, by providing a machine or "running" thread, as distinguished from a tapered pipe thread connection, between the pair of adapter body portions which form the adapter at each end of the line, the imperfect tightness of such machine threads permitting sufficient gas leakage to provide an effective test aperture.

Regarding other features of the installation technique, it has been found that, to prevent twisting of the plastic liner tubing and to effectively tighten the adapter connection at each end of the liner by expanding the pair of gaskets thereat, the service head adapter (adjacent and basement) must be tightened first, after which the blind end adapter (adjacent the gas main) can be more easily and effectively installed. In addition, the present invention contemplates and provides a method and means whereby the innermost (with reference to the length of plastic tubing) of the pair of gaskets on each adapter will be expanded first and fully secured before the outermost gasket is expanded against the interior of the service line, so that tightness of the innermost gasket is always assured. This ordered sequential expansion of the pair of gaskets at each end of the tubing is achieved by restricting the turning of the end nut or cap of each adapter. In the presently preferred embodiment to be described, a plastic interior abutment collar is disposed within the threaded endcap of each steel adapter to provide a relatively hard but temporary shoulder by which turning of the cap on the steel middle body of the adapter is prevented while force is applied to the adapter middle body to press against and expand the innermost gasket on the adapter main body. However, continued turning the the adapter endcap causes the screw threads on the shank of the middle body to cut and self-tap into the plastic collar, thus permitting the cap to move against and expand the outermost gasket, on the middle body component.

The assembly and installation of these end adapters and tubing is made after initially installing a temporary, so-called "convenience" valve in place of the conventional plug in the basement tee at the end of the service line, as will be described. Further, during certain stages of the installation a flexible elastic bag is placed over a projecting nipple on the convenience valve, the tools required for the by-pass installation being placed within the bag and then manipulated from the exterior of the bag, as will be described. The long rods necessary for moving tools down the interior of the liner tubing during the installation procedure extend through an opening which is opposite the neck opening of the elastic bag which holds it on the valve nipple.

The so-called "blind end" adapter adjacent to the gas main is installed having a "bullet" type sealing plug within the bore passageway therethrough, and beyond the referred to gas leakage passage. After both of these end adapters are installed within the line so that the by-pass is complete, a leakage test is made from the service head end of the tubing using a tool which has a machine threaded and O-ring seal connection to the service head adapter, as will be described, to permit test gas pressure to be exerted through the aforementioned leakage passage of the service head adapter commensurately with its exertion through the leakage passage of the remotely located blind end adapter. After completion of the test and removal of the testing tool, the "bullet", which has thus far prevented a flow of gas from the main, is removed from the blind end adapter using a tool passed through the temporary elastic bag on the convenience valve, after which the convenience valve is removed and the conventional plug is inserted in the basement service tee, thus to restore the gas service line to normal operation.

DETAILED DESCRIPTION OF PREFERRED EMBODIMENTS

These and other objects, features and advantages of the present invention will become apparent from the following detailed description of the invention, when taken together with the accompanying drawings in which:

FIG. 1 is a fragmented and cross-sectional elevation of a gas service line in which a by-pass liner tubing is being installed in accordance with the present invention;

FIGS. 2 and 3 are similar views showing earlier steps during the installation;

FIGS. 4, 5 and 6 are enlarged cross-sectional views of only the service head end adapter connection, illustrating a sequence of three stages in its installation;

FIGS. 7, 8 and 9 are views similar to FIGS. 4-6, but illustrating three sequential stages during the installation of the blind end adapter;

FIG. 10 is a perspective showing, to a smaller scale, of connections made between short lengths of rod to form a longer rod to be used during installation of the blind end adapter;

FIG. 11 is a cross-sectional and somewhat diagramatic illustration of the method of testing the installation of FIG. 1;

FIG. 12 is an enlarged fragmentary cross-sectional showing of the engagement between the gas pressure test tool and the service end adapter during the test, to further illustrate how testing of the installation is performed;

FIG. 13 is an enlarged cross-sectional view of a modified form of endcap which may be used on the blind end adapter in accordance with the invention; and FIG. 14 is a cross-sectional showing of still another modification of the blind end adapter as may be used.

Referring to FIG. 1, in a conventional gas service distribution network a gas main 20 lies buried in the ground under a street generally indicated by numeral 21. A service line connection tee 22, of steel or other material, is connected as by threads 23 to the top of the gas main 20, the connection tee having a threaded cap 24 on its upper end. A gas service line 25, made of similar steel pipe, extends some 25' to 50' underground from the connection tee 22 into the basement area, generally indicated by reference numeral 26, of a building whose concrete foundation wall and flooring are respectively indicated by reference numerals 27 and 28. At its service head end 25a which extends through the building wall 27, the gas service line 25 is connected by a basement service tee 29 to a riser pipe 30 which, through a gas service shut-off valve 31, leads to a gas meter (not shown) as is well known. Although FIG. 1 illustrates a convenience valve 32 coupled to the basement tee 29 by a nipple 33 for purposes as will be described, those skilled in the art will understand that the basement tee 29 is normally closed by a standard pipe plug (not shown) which is threaded into the end opening of the tee in place of the convenience valve nipple 33.

At a location within the length of the gas service line 25 between its street or "blind" end 25b and its service end 25a a curb valve 34 is usually installed, such being a conventional gate valve for shutting off the flow of gas in the line. The curb valve has a handle 34a which is reached by removing the valve box cover 35a, located at ground level, of a curb valve box, generally indicated by reference numeral 35, within which the valve 34 is exposed. As is well known, the curb valve is normally left open, and sometimes deteriorates after many years. Moreover, if one were to look through an opened curb valve 33 from the service end 25a of the lines, a pair of radially inward projecting lugs (not shown) which secure the valve seat in the valve body, as well as short, radially inward projecting portions of the valve spindle and valve gate (not shown) would be visible, and would tend to constrict the opening and interfere with the intended installation of the by-pass tubing arrangement. Accordingly, where a curb valve 34 is located within the service line, reaming out of these interiorly projecting portions of the curb valve will normally be necessary. Reaming or scraping may also be necessary to clean off interior rust or other scale, or to remove interior flanges or any other projecting portions of the service line prior to installation of the by-pass liner.

The present invention provides an interior by-pass liner assembly generally indicated by reference numeral 40, for bypassing any leaks, such as a leak 25c, along the length of the gas service line 25, as might have occurred by breakage, corrosion or other deterioration. Although the by-pass liner tubing 41 is preferably high density, high molecular weight, flexible polyethylene plastic tubing, it will be understood that other suitable plastic or metal tubing might be employed. Typically, 1" C.T.S. (Copper Tube Size) stiff polyethylene gas tubing having 0.090" wall thickness and an outside diameter of 1⅛" would be used as a liner within a 1¼" steel pipe service line, the inside diameter of which is actually 1⅜". In addition to the tubing 41 which in the preferred embodiment extends the entire length of the service line 25 from a "blind" end location adjacent the gas main 20 to closely adjacent the basement or service end 25a of the line 25, the by-pass liner assembly includes a blind end adapter, generally indicated by reference numeral 42, and a service head end adapter, generally indicated by reference numeral 43, which are respectively attached to the ends of the tubing 41, as indicated.

The linear assembly 40 is shown in FIG. 1 as fully assembled and installed within the service line 25. Although its adapter components and tubing might be pre-attached and actually installed in such assembled form, the assembly 40 is preferably assembled as the installation proceeds, in manner as will be described. Thus, the assembly 40 is intended to be furnished at the job site disassembled in what may be termed a kit of assemblable parts or components, these being a reel (not shown) of the plastic tubing from which the liner tube length will be cut to the exact size required, and other components which will be assembled during the installation, such as the service end adapter 43, the blind end adapter 42, and other as will be seen.

Further referring to FIG. 1, each of the adapters 42 and 43 as installed has a longitudinally spaced apart pair of radially expanded gaskets, respectively indicated by reference numerals 44, 45 and 46, 47, each forming an external peripheral seal between the adapter and the interior of the service line 25, and means forming a gas leakage passage between each of these pairs of gaskets, as generally indicated by the respective connection interfaces 48 and 49 therebetween, these leakage passages being provided by unsealed threaded connections and abutments between certain adapter component parts as will be described. Thus, and as will be seen, the by-pass assembly 40, and therefore in effect the tubing 41 has a gas leakage passage at each of its ends, extending from the interior of the by-pass liner to its exterior, at respective locations between the gasket pairs at each end, which have been expanded into peripheral sealing engagement with the interior of the service line 25. As previously noted, these gas leakage passages provide the means for testing the installed liner assembly 40 to confirm that the line will not leak when the flow of service gas is resumed.

Before proceeding with a description of the manner of installing and testing the by-pass assembly 40, reference is made to FIGS. 4 and 7 which respectively illustrate the component elements of the blind end adapter 42 and of the service end adapter 43 in assembled but not yet fully installed condition.

Referring first to FIG. 4 which illustrates the service end adapter 43, in addition to what will be referred to as the outer expansible gasket 46 and the inner expansible gasket 47 (with reference to the middle of the tubing 41), the service end adapter 43 has a tubular steel inner or main body generally indicated by numeral 50, to the serrated shank end 51 of which the plastic tubing 41 will be attached by a crimped-on metal sleeve 52. A pair of nitrile rubber O-rings 53, 54, mounted in appropriate peripheral grooves of the shank (not numbered), provide a fluid-tight seal between the tubing 41 and the adapter main body shank 51. The end of the tubing abuts against a peripheral abutment shoulder 55 of the adapter main body 50. The sleeve 52 which, of course, was previously mounted on the tubing 41, is slid over the attachment, and over the peripheral shoulder 56 into abutment against a second abutment shoulder 57. The sleeve 52 is crimped on to the tubing 41 and shank 51 by three peripheral extending crimps 58a, 58b, 58c which are formed by a crimping tool (not shown). A longitudinal slot (not shown) in the sleeve though which the tubing and shoulder 55 may be seen provides assurance that the tubing 41 is butted against shoulder 55 before crimping.

The adapter main body 50 further has a conical shoulder 60 which tapers inwardly, at an angle of about 35°, from the outer diameter 61 of the main body to the smaller diameter threaded extension 62 at the front end of the body, as shown. The central bore 50a of the service end adapter main body has internal left-hand coarse machine threads 63 along that portion of its length which passes through the extension 62, for use during installation and for testing purposes as will be described. The external threads 62a on the extension 62 are right-hand coarse machine threads which provide a running fit and therefore do not provide a fluid-tight seal.

The service end adapter 43 further has a steel inner or middle body 65 whose outer diameter 66 is the same as the outer diameter 61 of the main body 50. It has a widened internal bore 67 having internal threads 67a which mate with the threads 62a of the main body extension 62, on which the middle body is mounted. The smooth central bore 68 of the tubular middle body 65 has a diameter only slightly larger than the diameter of the main body bore 50a to slidably receive an assembly holding tool 85, and a leakage testing tool (FIG. 12) as will be described. In manner corresponding with the same features of the main body 50, the middle body 65 has a conical shoulder 69, and a front extension 70 having external right-hand coarse machine threads 70a.

The outer and inner gaskets 46 and 47 are made of Buna-N rubber or similar resilient plastic or other radially expandable elastic material, and are initially mounted respectively on the middle body extension 70 and on the main body extension 62, as shown. The inner diameters of these gaskets approximate the outer diameters of these extensions so that the gaskets are slidable thereon, and the outer diameters of the gaskets are slightly less than the internal diameter of the service line 25 against which they will be urged and will seal. It will be noted that both gaskets 46 and 47 are chamfered internally, as at 46a and 47a, to conform with the shapes of the respective conical shoulders 69 and 60 against which they initially rest and on which they will be expanded. Respective metal compression rings 72 and 73 are slidably mounted adjacent the gaskets 46, 47, gasket 47 and ring 73 being abutted and retained on the main body extension 62 by the rearwardly facing abutment shoulder 74 of the middle body 65 when the latter is threadedly mounted on the extension 62, as shown.

The outer gasket 46 and its compression ring 72 are abutted and retained by a cylindrical endcap 75 which has internal threads 76 by which it is mounted on the corresponding threads 70a of the middle body extension 70. The endcap 75 has a rearwardly facing abutment shoulder 77 which engages the metal compression ring 72. The endcap further has a ring-shaped insert liner collar 78, made of stiff plastic such as nylon, which is firmly secured by any conventional means within the internal peripheral surface 79 of the cap for a purpose to be described. However, it should be noted that the internal diameter 78a of the plastic liner collar 78 is substantially equal to the root diameter of the middle body external threads 70a, and that the outer diameter 78b of the collar 78, which corresponds with the cap internal surface 79, is slightly greater than the outside diameter of the threads 70a. Further, the cap 75 has a castle-like configuration along its front-end face 80, formed by a pair of diametrically opposite spanner notches 81 which will be engaged by similar diametrically opposed spanner projections 91 on a tubular spanner tool 90 for tightening the cap 75 during the adapter installation procedure. The external diameter 90a of the tool 90 is smaller than the internal diameter of the service line 25, and the internal axial bore 92 of the tool is at least as large in diameter as the bore of the adapter middle body 68 so that the spanner 90 will be slidable over the rod-like holding tool 85.

Similarly, and referring now to FIG. 7 which shows the blind end adapter positioned, but not yet installed within the service line 25, the blind end adapter 42 has, in addition to its expansible outer gasket 44 and inner gasket 45, a tubular steel inner or main body generally indicated by reference numeral 95, which has a serrated shank end 96 on which the plastic tubing 41 will be attached by a crimped-on metal sleeve 97. The intended fluid-tight seal between the tubing 41 and the shank 96 is assured by a pair of nitrile rubber O-rings 98, 99 which are mounted in appropriate peripheral grooves of the shank (not numbered). The end of the tubing 41 seats against an abutment shoulder 100 of the adapter main body 95, and the metal sleeve 97 is mounted on the peripheral shoulder 101 of the adapter body, its end seating against a second abutment shoulder 102. The sleeve is crimped on to the tubing 41 and shank 96 by three peripheral extending crimps 103a, 103b and 103c.

The blind end adapter main body 95 further has a conical shoulder 105 which tapers inwardly from the outer diameter 106 of the main body to the smaller diameter extension 107 at the front end of the body, as shown. Forward of the shoulder 105 the extension 107 has external lefthand coarse machine threads 107a which provide a running fit and therefore do not provide a fluid-tight seal, and it will be noted that the axial bore 108 of the main body extends smoothly through its entire length.

The blind end adapter 42 further has a steel outer or middle body 110 which is similar to the middle body 65 of the service end adapter. It has a smooth central bore 111, and an outer diameter 112 which is equal to the outer diameter 106 of the adapter main body 95. The middle body further has a widened internal bore 113 having internal threads 113a which mate with the threads 107a of the main body extension 107, on which the middle body 110 is mounted. Similar to the same features of the main body 95, the middle body 110 has a conical shoulder 114 and a front extension 115, the latter having external lefthand coarse machine threads 115a.

The soft Buna-N rubber outer and inner gaskets 44 and 45 are slidably mounted respectively on the middle body extension 115 and on the main body extension 107, each being followed by a metal compression ring 116 and 117, respectively. The gasket 45 and ring 117 are abutted and retained on the main body extension 107 by a rearwardly facing abutment shoulder 118 of the middle body 110 when the latter is threadedly mounted on the extension 107 as shown. Except as previously noted, the shapes, sizing and arrangement are the same as those described in connection with the service end adapter 43.

However, the outer gasket 44 and its compression ring 116 are abutted and retained by the rearwardly facing abutment shoulder 120 of a slightly different, elongated endcap 121 which is threadedly mounted on the middle body extension threads 115a by corresponding left-hand internal cap threads 121a. The endcap 121 has a ring-shaped insert liner collar 123 as does the service end adapter cap 75, the liner being secured by any conventional means within the internal peripheral surface 124. The liner collar 123 is made of stiff plastic, such as nylon, for a purpose to be described. However, it should be here noted that the internal diameter 123a of the plastic collar 123 is substantially equal to the root diameter of the middle body external threads 115a, and that the outer diameter 123b of the collar 123, which corresponds with the cap internal surface 124, is slightly greater than the outside diameter of the threads 115a. Further, the blind end adapter endcap 121 has a rod-like tool engagement pin 125 attached to extend diametrally across the otherwise open tubular bore of the cap, for use during the installation procedure.

Also illustrated in FIG. 7 in position within the blind end adapter 42 is a short-length, solid rod-like installation tool 130, which for convenience will be referred to herein as a "bullet". The bullet 130 mounts a pair of spaced apart O-rings 131 and 132 whose diameters are such as will form a fluid-tight seal within the adapter middle body bore 111 when the bullet is inserted therein.

At its forward end the bullet 130 has a diametrally extending recess or channel 133 which receives and engages the diametral pin 125 of the adapter endcap so that, by means of the bullet, the cap 121 can be twisted and tightened on to the adapter middle body 110 during the installation procedure, as will be described. For the same purpose, the opposite end of the bullet 130 mounts a "quick-connect" type fitting 134, which is preferably of the type sold by Dzus Fastener Co., Inc. of West Islip, N.Y., under the trademark "Anchor-Cam", and to which a chain of similarly connected extension rods is connected during the installation procedure both to tighten the adapter cap and, later, to disengage and retrieve the bullet 130 so as to restore the flow of service gas in the installed service line by-pass, as will be described.

An alternative, flow fuse type endcap 140 which may be substituted for the endcap 121 of the blind end adapter is shown in FIG. 13. This embodiment includes internal threads 141 by which the cap is mounted on the extension threads 115a of the adapter middle body 110, a plastic insert liner collar 142, and a diametrally extending tool engagement pin 143, as in the cap 121. However, the forward end of its elongated and tapered steel body mounts a stiff plastic insert 144 whose central bore 145 is conically flared towards its forward end, as shown. A flow fuse 146 has a stem 147 which is very loosely mounted within the bore 145 to guide the slidable movement of the plug, yet not significantly obstruct the normal flow of service gas therethrough when the service line 25 is restored to operation. The head 148 of the flow fuse is axially splined around its outer periphery, as indicated at 148a to similarly permit the normal flow of gas around the fuse head, yet provide for axial slidable movement of the fuse head within the cylindrical cap bore 149 when the fuse opens and closes in response to gas pressures.

The flow fuse 146 is a normally open fuse as shown, and includes a coil spring 150 which urges its head 148 away from the forward end of the cap and into engagement at its tip 148b against the diametral pin 143 to retain it in such open position. Thus, during and after the installation of the blind end adapter having such cap 140 within the service line 25, the flow of gas within the service line and therefore, within the tubing 41, will flow through the flow fuse. However, this flow fuse will close in response to the intended leakage test pressure, of about 50 p.s.i.g., when applied within the by-pass liner tubing 41 from the service head end of the line, as will be described. When closed by such test pressure, a soft head gasket 151 seals against the end 145a of the plastic insert bore 145, to stop the flow of gas service through the bore 145. When the pressure test is completed and the test pressure within the by-pass is discontinued, the flow fuse will open in response to the bias of the coil spring 150, and the flow of normal service gas will resume within the by-pass line.

FIG. 14 illustrates another modified form of blind end adapter 42a for stopping the flow of line service gas in a different manner when the intended line leakage test is to be performed. This adapter 42a is similar to the previously described blind end adapter 42 (FIG. 7) including its end cap 121, but has a modified form of middle body 155.

That is, its inner or main body 95 is attached to the liner tubing 41 by a crimped on sleeve 97 as previously described, and the adapter includes a pair of expansible elastic gaskets 44, 45 and respective steel retainer or compression rings 116, 117. Moreover, the modified form of middle body 155 has external threads 115a on its forward extension, which engage the internal threads 121a of the endcap 121. The endcap also includes a diametral pin 125. However, the middle body 155 has a threaded internal bore 156 whose right-hand threads are preferably machine type, running threads for easy removal of a threaded plug 157 whose external threads 158 are engaged therewith when the plug 157 is inserted, as shown. The plug includes a conical shoulder 159 at its rearward end, which might be gasketed, but in any event seats and seals against the periphery of an interior conical shoulder 160 within the body 155. The plug 157 is installed and removed using a rod-like tool 161 having a projecting left-hand threaded tip 162 which is engageable with a correspondingly threaded recess 163 of the plug.

As in the case where a flow fuse type cap 140 is used, the modified form of blind end adapter 42a must be installed while live service gas is flowing through the service line 25, during which installation the endcap pin 125 must be accessible. However, when the line leakage test is to be performed (as will be described), the plug 157 is inserted to stop the flow of service gas during the test. Upon completion of the test, the plug 157 is removed to permit the flow of service gas to resume.

From the foregoing descriptions of the preferred embodiments (as shown in FIGS. 4 and 7) of both the service end adapter 43 and the blind end adapter 42 it will be apparent that, because the threaded connections between their respective main and middle body components are running-thread connections which do not provide fluid-tight metal-to-metal contact seals, their respective gas leakage passages 48 and 49 (FIGS. 1, 4 and 7) will be formed by the unsealed surface-to-surface connections provided by the threads 107a, 110a and 62a, 67a and between the respective steel rings 117 and 73 and their adjacent middle body abutment shoulders 118 and 74, respectively. Thus, these gas leakages extend through these adapters from their interior tubular bores to the exteriors thereof, at respective locations between the gasket pairs 44, 45 and 46, 47 as previously mentioned. Alternatively, the gas leakage passage from the interior of the adapter to its exterior might be formed by drilling an aperture through the adapter middle body element of either the service end adapter (not illustrated) or the blind end adapter, such as the aperture 165 of the modified blind end adapter middle body 155 (FIG. 14), at a location such that the aperture will not be obstructed by the threaded forward end extension of the connecting main body element after the installation is complete. In such alternate embodiment, the threaded connection between the main and middle body elements might be a tapered pipe thread or otherwise sealed to provide a very tight fit between these elements, yet the required gas passage for testing purposes, as will be described, is still provided. It should also be noted that for purposes of the test, the location of the leakage aperture 165 must be on the service line side of the line plug, such as the bullet 130 (FIG. 7), or the flow fuse at 146 (FIG. 13), or the plug 157 (FIG. 14), which stops the flow of service gas during the test.

Turning now to the procedure by which the liner by-pass installation is made, as an initial step any curb valve in the gas service line 25, such as the curb valve 34 (FIG. 1), is temporarily closed while the convenience valve 32 is installed in place of the conventional plug (not shown) at the end of the basement service tee. If the line 25 does not include a curb valve, or if through deterioration the curb valve cannot be closed, the convenience valve 32 can be installed "on the fly", i.e., by removing the plug and quickly threading the convenience valve nipple 33 in its place. Of course, the convenience valve 32 is closed when installed, and has an open pipe nipple 36 projecting from its interior facing end, through which the entire installation procedure is conducted. The curb valve 34 may then be opened.

Using any conventional techniques the interior of the service line 25 including the curb valve 34 is then reamed to remove projections or rough edges which might later cut through the plastic by-pass tubing 41.

Thereafter, the convenience valve 32 is closed, and the blind end adapter 42 (FIG. 7) is assembled. Its soft Buna-N inner gasket 45 is first mounted on the tubular main body 95, against the peripheral expansion shoulder 105 of the latter. The gasket 45 is followed by the metal pressure ring 117. Next, the tubular middle body 110 is threaded on to the main body 95 of the adapter, to a position beyond which further tightening of the threaded connection would cause pressure on the ring 117 to force the gasket 45 to ride up on, and expand against the tapered shoulder 105. The second expansible gasket 44, followed by the metal pressure ring 116 and the end cap 121, are then similarly mounted on the threaded extension 115 of the adapter middle body 110. That is, the cap 121 is tightened, to a position where further tightening would press the pressure ring 116 against the second gasket 44 and cause it to ride up on, and expand against the tapered shoulder 114 of the middle body. When the cap is tightened to this position its plastic insert collar 123 is immediately adjacent to the end of the threaded middle body extension 115, as seen in FIG. 7. The plastic insert 123 thus provides a semi-hard shoulder against the end of the middle body extension to prevent further engagement movement of the cap thereon under normal twisting pressure until such further movement is desired, as will be described.

The interior sealing bullet 130 is then inserted into the assembled blind end adapter so that its recess channel 133 engages the diametral pin 125 of the endcap, and its pair of then greased O-rings 131, 132 effect a gas-tight seal against the smooth interior bore 111 of the adapter middle body.

The thus assembled blind end adapter 42, with the bullet 130 therein, is then attached to the end of the plastic tubing 41 which will serve as the by-pass liner, the attachment being by crimping on of the external metal sleeve 97 to provide a fluid-tight connection between the tubing 41 and the main body shank 96 as previously described. At this time the plastic tubing is of indefinite length, being wound upon the supply reel (not shown) on which the tubing is furnished from the manufacturer.

Referring again to FIG. 1, a neoprene rubber inflation bag 170 is then fitted on to the open projecting end of the convenience valve nipple 36. In a typical installation the bag 170 (FIG. 1) may have a 1″-diameter elastic collar 170a which stretches to fit over the 1¼″ outside diameter of the nipple 36 to thus form a temporary gas-tight seal. For such a typical installation the bag 170 may be about 18″ long and have relatively square 8″×8″ shape along its length. At its opposite or rearward end the bag 170 has a ¾″-diameter opening 171 through which the blind end adapter 42, attached to the tubing 41 as previously described, is then inserted into the bag.

Referring now to FIG. 2, the convenience valve 32 is then opened using its handle 32a. After the curb valve 34 has been opened the bag 170 will be inflated by the natural flow of service gas through the service line 25 from the main 20, the bag 170 being sealed at its opposite end by the gas-tight fitting relation of the elastic aperture 171 around the liner tubing 41 which is at the time projecting therethrough, as shown. The curb valve 34 may remain closed until the blind end adapter 42 has been inserted into the service line and moved to the location of the curb valve, as will now be described. Manipulating the tubing 41 from the exterior of the bag 170, the tubing is pushed in the direction of the arrow A, and fed through the bag 170 to move its attached blind end adapter 42 into and down the service line 25. When the curb valve is opened, the blind end adapter is pushed through and past the curb valve 34, to abutment against the far wall of the main connection tee 22. Where it is exposed outside of the bag aperture 171, the tubing is then marked with a reference point (not shown), whereupon it is backed out of the bag 170 a predetermined distance (equal to the length of the attached bag 170, plus the length of the convenience valve 32 including its nipple 33 and any appropriate portion of its nipple 36, plus the length of the basement tee 29, plus a distance equal to, or slightly greater than that length of the assembled service end adapter 43 (FIG. 4) which extends from the end of the cap 75 to the tube abutment shoulder 55 on the adapter main body 50, and plus a distance equal to or slightly greater than the diameter of the main connection tee 22), at which point the tubing 41 is cut, thereby severing exactly the needed length thereof from the reel supply.

Next, the service head adapter 43 is attached and assembled on the exposed end of the tubing 41 in the manner previously described. That is, and referring briefly to FIG. 4, the end of the tubing 41 is crimped on to the adapter main body 50, whereupon the gasket 47 and compression ring 73 are slidably mounted on the main body extension 62. The middle body 65 is then threaded on to the extension 62 to the point where the gasket 47 abuts the expansion shoulder 60 of the main body 50. The gasket 46, compression ring 72 and endcap 75 are then similarly mounted on the threaded middle body extension 70, the cap being threaded on as tightly as it will move by manual twisting, at which point its insert collar 78 will be in abutment with the end of the body extension 70, and the gasket 46 will be against the middle body expansion shoulder 69, as seen in FIG. 4.

Continuing to refer to FIG. 4, but while the service head adapter 43 is still exposed in the basement though attached to the tubing 41, the rod-like service end adapter holding tool 85 is attached to the service head adapter 43 by threading its external left-hand end threads 86 into the internal left-hand threads 63 of the main body. An O-ring 87 at the inner end terminus of the threads 86 of the tool provides a cushioned "land" against the end of the adapter body extension 62, indicating when the tool is fully inserted into the adapter 43.

Referring now to FIG. 3, using the holding tool 85 to again move the tubing 41 down the service line 25, the service head end adapter 43 is pushed through the bag aperture 171 into the bag 170 and thence through the convenience valve 32 and basement tee 29 to its intended location as illustrated, within the service line 25. Because the installation is being made "in the blind", so to speak, this positioning of the service head adapter 43, and thus the correct positioning of the blind end adapter 42 as seen in FIG. 3, is predetermined with reference to the length of the holding tool 85 which must be inserted into the bag 170. That is, the distance inward beyond the bag aperture 171 which the tubing 41 must be moved is equal to that which the tubing 41 was "backed out" of the bag from the position of the tubing as shown in FIG. 2 for cutting the tubing to the correct length, as previously described, minus a distance equal to the diameter of the main connection tee 22 (to position the blind end adapter 42 as shown in FIG. 3 rather than as shown in FIG. 2). For the purpose, an appropriate reference point (not shown), measured from the service head adapter shoulder 55 (FIG. 4), is marked on the shaft of the holding tool 85 before the adapter 43 is inserted into the bag aperture 171.

It will be noted that the bag 170 continues to be inflated while the assembly 40 is being thus positioned within the service line 25 because, although the bullet 130 within the blind end adapter 42 prevents gas flow within the tubing 41, gas from the main 20 is free to flow within the service line 25 exterior of the tubing 41. It will further be noted that the size of the bag aperture 171 must be small enough to tightly engage and seal against the shaft of the holding tool 85 as the latter is passed therethrough.

The service head end adapter 43 will now be tightened and thus attached within the service line 25 in its position shown in FIG. 3, and for this purpose the tubular spanner wrench 90 is mounted and moved in the direction of arrow B on the shaft of the holding tool 85, as illustrated in FIGS. 3 and 4, until its spanner projections 91 engage the spanner notches 81 on the adapter endcap 75 as seen in FIG. 5. Of course, the spanner tool is forced through the bag aperture 171 into the bag 170 and thence into such engagement, as will be understood. As indicated in FIG. 3, the wrench 90 has handles 93 at its opposite end which remain outside of the bag 170, by which the wrench may be turned.

Referring to FIG. 5, and recalling that the holding tool 85 has left-hand threads 86 whereas the endcap 75 has internal right-hand threads 76, the service end adapter cap 75 may now be turned clockwise using the wrench 90 while the holding tool 85 retains the adapter main body 50, and consequently the tubing 41, in position and against turning. Because of the abutment of the cap insert collar 78 against the end of the adapter middle body 65, such clockwise turning of the cap will cause concurrent clockwise turning of the middle body 65 and, because of the somewhat hard nature of the plastic of which the collar 78 is made, the cap will not itself further advance on the middle body 65. Thus, the middle body 65 is threadedly tightened on to the right-hand threads 62a of the adapter main body extension 62 and, as illustrated in FIG. 5, the gasket 47 is forced on to the expansion shoulder 60 and is expanded into sealing engagement with the interior wall of the service line 25, the force being transmitted by the advancing middle body 65 against the compression ring 73 and thence against the gasket 47.

As the gasket 47 becomes fully expanded as seen in FIG. 5 and continued tightening force is exerted on the spanner tool 90, the resistance to further axial movement of the adapter middle body 65 on the main body threads 62a becomes greater than the resistance of the plastic material of which the insert collar 78 of the cap 75 is made (which resistance has thus far prevented the cap from further threaded movement on the middle body extension 65), whereupon the cap 75 begins to turn on the extension threads 70a as the latter begin to cut and self-tap into the plastic material 78. Thus, continued right-hand twisting of the spanner tool 90 while holding the holding tool stationary as illustrated in FIG. 5 will cause the gasket 46 and compression ring 72 to move axially along the middle body extension 70 as the cap 75 threads inwardly, and the gasket 46 rides up on to and is radially expanded by the middle body expansion shoulder 69 into peripheral sealing engagement with the interior wall of the service line conduit 25, as illustrated in FIG. 6.

Continuing to refer to FIG. 6, the service head end adapter 43 has now been tightly secured within the service line 25, whereupon the spanner tool 90 and holding tool 85 are removed in the direction of arrow C. Because the adapter is tight, it will be noted that the holding tool 85 can be easily loosened from its left-hand threaded connection within the adapter main body 50.

It will also be noted that, as the gaskets 46 and 47 become tightly sealed against the interior wall of the service line 25, the flow of service gas from the gas main 20, which cannot enter the liner 41 because the bullet plug 130 (FIG. 7) is within the blind end adapter 42, is now completely stopped, and the inflation bag 170 (FIGS. 2 and 3) will deflate and collapse as the spanner and holding tools are withdrawn through the bag aperture 171. In fact, such collapse of the bag indicates an effective seal has been made, and the bag 170 can therefore be removed from the valve nipple 36 without fear of leakage of gas. If the bag fails to collapse completely, an effective gas-tight seal has not been formed at one of either the service end adapter or at the bullet 130, and appropriate corrective action would be required.

The sequence in which first the seal 47 and then the seal 46 is made, is an important feature of the invention by which full and effective sealing of the innermost gasket 47, which is the more important gasket of the pair 46, 47, can be assured. Moreover, the full securing of the nearer service end adapter 43 within the service line 25, prior to attempting to tighten the remotely located blind end adapter 42, has been found to result in a more effective installation, which is achieved with less difficulty than were the blind end adapter attempted to be secured in place first.

The blind end adapter 42 will now be tightened and sealed in its position with the line 25 as shown in FIG. 3, using a blind end adapter tightening tool as generally indicated by reference numeral 180 in FIG. 10. Because the tool must extend from the basement or service end 25a within and down the entire 25' to 50' length of the by-pass liner tubing 41 to reach the blind end adapter adjacent to the gas main 20, the tightening tool 180 is preferably formed by connecting in tandem a series of shorter length tool shank sections 181, each about 2' or 3' long, as the tool is being inserted into the line from the building basement area 26. Although these sections might be connected in any convenient manner such as by threaded couplings (not shown), they may be conveniently connected and disconnected by employing quick-connect coupling elements on their respective ends, such as the aforementioned "Anchor-Cam" female connector elements 182 on one end, and co-mating male connector elements 183 on the other end of each shank section 181, as shown in FIG. 10. At least the fitting 182a on the leading end of the first shank section must be engageable with the quick-connecting fitting 134 (FIG. 7) on the inner end of the bullet 130 which is in the blind end adapter 42.

It will also be understood that all of these rods and rod couplings must have smaller diameters than any of the adapter body bores 68 and 50a of the service end adapter 43 (FIG. 4) or the blind end adapter bore 108 (FIG. 7).

Starting with the tool shank section 181 having the fitting 182a thereon (FIG. 10), the blind end adapter tightening tool 180 is introduced through the convenience valve 32 into and down the length of the tubing 41. It will be noted that, because there is no flow of service line gas, no inflation bag, such as the bag 170 (FIG. 1) need be used at this time.

Referring now to FIG. 8, the tool 180 reaches and connects on to the bullet 130 within the blind end adapter, the spring-loaded female quick-connect fitting 182a snapping into engagement within the male fitting 134 on the end of the bullet, as shown.

Because the bullet groove or channel 133 at its forward end is already in engagement with the blind end adapter cap pin 125, clockwise turning of the tool 180 will cause tightening of the left-hand threaded endcap 121 and, concurrently, of the adapter middle body 110 on to the left-hand threaded main body extension 107. The middle body 110 moves concurrently with the cap 121 because of the shoulder abutment formed by the plastic insert collar 123 of the cap against the end of the middle body extension 115, whose resistance to turning force is greater than that of the threaded connection between the middle body 110 and the main body 95. Thus, as it threads inwardly along the main body extension threads 107a, the middle body 110 pushes the compression ring 117 and the gasket 45 therealong, causing the gasket 45 to ride up on, and radially expand against the main body expansion shoulder 105 until the gasket is fully expanded into peripherally sealing engagement with the interior wall of the service line conduit 25, as seen in FIG. 8.

The increased resistance to further twisting movement encountered by the middle body 110 as the gasket seal 45 becomes fully formed, overcomes the resistance to turning as has thus far been afforded by the nature of the plastic material of which the cap insert collar 123 is formed. Accordingly, continued twisting of the tightening tool 180 in the clockwise direction causes the endcap 121 to move and tighten on the middle body extension threads 115a, the steel threads 115a cutting into, and self-tapping the plastic collar 123. Such tightening is continued as the gasket 44 is now moved against and expanded on the expansion shoulder 114 of the adapter middle body 110, the cap 121 exerting longitudinal force on the longitudinally slidable gasket compression ring 116 which, in turn, transmits such force to the gasket 44. When the gasket 44 has been fully expanded into gas-tight sealing relation against the periphery of the interior wall of the service line 25 as seen in FIG. 9, the blind end adapter is fully installed, and the tightening tool 180 is removed.

As was the case with the service end adapter 43, it will be noted that the innermost gasket 45 of the blind end adapter 42 is tightened first, which provides greater assurance that an effective seal at this, the most important gasket of the gasket pair 44, 45, has been achieved.

The tool 180 is removed by twisting it only one-quarter turn in the counterclockwise direction to quick-release the cam connection between the female tool connection element 182a and the bullet connector element 134. In this regard, it should be noted that this spring-loaded engagement connection must not be as tight or as stiff as the similar connections 182, 183 (FIG. 10) between the tool shank sections 181, otherwise the tool sections would, upon such counterclockwise turning of the tool 180, disengage and cause disassembly of the tool section within the tubing 41, yet the endmost tool shank section would not be disengaged from the bullet.

The by-pass liner installation 40 is now complete, but must be tested for possible gas leakage, as will now be described with reference to FIGS. 11 and 12. In the presently preferred embodiment, compressed natural gas pressure at 50 p.s.i.g. will be applied into the by-pass system 40 continuously for a period of 15 minutes from a source 200 through a tubular testing tool 201 which will be connected to the service head end adapter 43, as will now be described.

The inflation bag 170 is now again connected by its elastic collar 170a to the convenience valve nipple 36, the convenience valve 32 still being in opened condition. The tubular tool 201 is connected at its rearward end to the test gas source 200 through a valving and pressure meter arrangement, generally indicated by numeral 202 in FIG. 11. Its connection to the meter and valve is preferably via a pivotable though air-tight quick-connect coupling generally indicated by numeral 206. The forward end of the tool 201 is then inserted through the bag aperture 171 and bag 170, and through the convenience valve 32 and basement service tee 29, into the service line 25 and, ultimately, into the service end adapter middle body bore 68.

As seen in FIG. 12, the forward end of the tubular testing tool 201 is externally threaded as at 203 to be received in the left-hand threads 63 within the bore 50a of the service end adapter main body extension 62, and it will be noted that these are coarse machine threads, which provide a running fit and are not gas-tight. Thus, test gas pressure will seep through these threads 63, 203 when applied from the tool 201 into the mainbody bore 50a.

The tool 201 further has a pair of external, longitudinally spaced apart resilient O-rings 204, 205 which provide a peripheral gas-tight seal behind these threads 62a, 203, within the smooth bore 68 of the adapter middle body 65.

It should also be noted that the spacing, or even a metal-to-metal abutment, between the end of the adapter main body extension 62 and the internal end shoulder within the widened bore 67 of the adapter middle body 65 permits gas to pass therebetween, and that, as previously noted, the connection between the middle body threads 67a and the adapter main body threads 62a is not gas-tight. Gas will also seep through the metal-to-metal abutment interface between the middle body abutment shoulder 74 and the compression ring 73. Thus, the passage 49 of the adapter 43 is formed by these gas leakage passages, yet the test gas will not leak past the O-rings 204, 205 which are mounted on the tool 201 for sealing the middle body bore 68 on the service end side of the passage 49.

Similarly, and referring briefly to FIGS. 7 and 9, the gas leakage passage 48 of the finally installed blind end 42 is formed by the spacing between the end of the adapter main body extension 107 and the internal abutment shoulder within the enlarged bore 113 of the adapter middle body 110, and by the running fit between the main body extension threads 107a and the internal threads 113a of the middle body, and by the leakage permitted by the metal-to-metal abutment between the end shoulder 118 of the middle body 110 and the compression ring 117. The O-ring seals 131, 132 on the bullet 130 (FIG. 7) provide a plug which will prevent test pressure leakage through the end of the blind end adapter 42, at a location beyond (i.e., on the gas main side of) the gas leakage passage 48.

Referring again to FIGS. 11 and 12, after the tool 201 has been threadedly connected to the service end adapter 43, 50 p.s.i.g. of test pressure is applied therethrough by opening and then closing the valve 202a, the pressure being shown on the gage 202b. Because there should not be any pressure therein at the time, the inflation bag 170 should remain collapsed during the test. However, although it therefore need not be used during the test, use of the bag 170 at this time serves as a precaution against any blow-back of gas during the test, if certain seals are ineffective, as will be understood.

During the test, 50 pounds per square inch of test gas pressure is monitored for 15 minutes via the adapter leakage passages 48 and 49 to the peripheral spaces between each of the longitudinally spaced apart gasket pairs 44, 45 and 46, 47 of the respective adapters, and also within the interior of the by-pass tubing 41. If the by-pass installation 40 is in any way unsound, some drop in pressure will be detected on the gage 202b, which senses the pressure remaining within the tubing 41.

It will be noted that the exact location of the test gas leakage which causes the drop in pressure will not be known. That is, the test pressure drop could be due to leakage through any one of the four gasket seals 44, 45, 46 or 47; or through the bullet O-rings 131, 132; or through the test tool O-rings 204,205; or through either of the crimped connections between the ends of the liner tubing 41 and the respective adapter main bodies 50 and 95; or through a tear or other defect in the tubing 41 itself. If such loss of test pressure does occur, the entire installation 40 must be rechecked to determine the leak source.

After a successful pressure test has been performed, the test tool 201 is removed and, if not already in place, the inflation bag 170 must be connected to the convenience valve nipple 36 preparatory to the removal of the blind end adapter bullet 130, as is necessary to restore the flow of service gas in the by-pass liner installation 40.

To remove the bullet 130 the blind end adapter tightening tool 180 shown in FIG. 10 is again made up as it is inserted through the inflation through the inflation bag aperture 171 and moved down the tubing 41 into engagement with the fitting 134 at the end of the bullet 130, as indicated in FIG. 8. The bullet is removed by pulling straight back on the tool 180 working from the exterior of the inflation bag 170.

As soon as the bullet 130 is pulled free from its engagement with the adapter pin 125 and its O-ring engagement within the adapter bore 111, service gas will flow from the main 20 into and through the interior by-pass liner installation 40 to the basement tee 29, and thence up the service riser 30 (FIG. 1). The bag 170 will, of course, inflate, showing that the bullet has been pulled free. The rod-like shank sections 181 are then disconnected as the tool 180, carrying the bullet 130, is withdrawn from the line through the bag aperture 171.

However, before the shank section 181 which carries the bullet 130 is finally removed from the bag 170, the convenience valve 32 is closed. The bag 170 may then be removed from the valve nipple 36, and the bullet 130 removed from the bag. The closed convenience valve and its connection nipple 33 are then removed from the basement tee 29 and the conventional basement tee plug (not shown) is substituted, "on the fly" as is a well-known technique. The gas service system has then been fully restored to operation.

Thus has been described an interior by-pass liner installation, including its component elements, and techniques for making and testing it, which achieve all of the objects of the invention.

What is claimed is:

1. An adapter kit of component parts capable of being assembled and attached to an end of a length of tubing to expandably connect and seal the tubing end within and to the interior surface of a larger diameter pipe, said kit comprising a generally cylindrical inner body having an elongated forward end and an opposite shank end, said shank end being adapted to be attached to said tubing end, a generally cylindrical middle body having an elongated forward end and a rearward end, said rearward end of the middle body and said forward end of the inner body each having thereon the respective of comating thread means adapted to connect them together and to provide longitudinal movement of said middle body on and along said inner body forward end, at least one of said inner and middle bodies being adapted to provide a gas-leakage passage extending from the interior to the exterior thereof when said bodies are so connected together, said inner body further having a peripherally extending and outwardly projecting gasket-expander shoulder located between its said elongated forward end and its said shank end, and said middle body further having first and second peripherally extending and outwardly projecting gasket-expander shoulders the first of which faces said inner body gasket-expander shoulder when said inner and middle bodies are so connected together and the second of which is located between said middle body rearward and forward ends, a pair of radially expandable sealing gaskets respectively adapted to be mounted on said forward end of said inner body and on said forward end of said middle body respectively adjacent to said inner body gasket-expander shoulder and to said second gasket-expander shoulder of the middle body, a substantially cylindrical end cap, said cap and said forward end of said middle body each having thereon the respective of comating thread means adapted to connect them together and to provide longitudinal movement of said cap on and along said middle body forward end, said cap having a peripherally extending shoulder adapted to face said second gasket-expander shoulder of the middle body when said cap and said middle body are so connected together, whereby, when said inner and middle bodies and said cap are so connected and respectively moved longitudinally together and said gaskets are mounted respectively on said inner and middle body forward ends, each of said sealing gaskets is expanded radially by its engagement substantially with and between its adjacent cofacing pair of gasket-expander shoulders responsive to said movement such that its outside diameter becomes larger than the outside diameters of said substantially cylindrical inner and middle bodies, said gas-leakage passage having an exterior end terminus located between said pair of gaskets when so expanded.

2. An adapter kit according to claim 1 wherein the respective of said comating thread means on said rearward end of the middle body and said forward end of the inner body are running threads adapted to provide said gas-leakage passage when said bodies are threadedly connected together.

3. An adapter kit according to claim 1 wherein said middle body has a wall portion including means defining an aperture therethrough disposed for communicating with the interior of said generally cylindrical inner body when said inner and middle bodies are connected together, thereby providing said gas leakage passage when said bodies are so connected together.

4. An adapter kit according to claim 1 which further comprises means adapted for disposition between said end cap and said middle body and to temporarily resist at least the terminal portion of said longitudinal moving together of the end cap and middle body until after substantial completion of said longitudinal movement together of the middle and inner bodies, whereby said sealing gasket when disposed between said middle and inner bodies is substantially fully expanded, to a diameter which is substantially larger than the outside diameter of said inner and middle bodies, prior to said expanding of the other said sealing gasket when disposed between said end cap and said middle body.

5. An adapter kit according to claim 4 where said means adapted for disposition between said end cap and said middle body and to temporarily resist at least the terminal portion of said longitudinal movement therebetween comprises shoulder means of semi-hard material as compared with that of said end cap or said middle body whereby, when said shoulder means is disposed between said cap and middle body and the latter are threadedly connected together, turning force applied to said end cap can be transmitted through said semi-hard shoulder means to said middle body and, after said sealing gasket when disposed between said inner and middle bodies has been substantially fully expanded, said semi-hard shoulder means yields upon continued application of said turning force to permit further longitudinal moving together of said end cap and said middle body thereby to fully expand said other sealing gasket when disposed therebetween.

6. An adapter kit according to claim 5 wherein said semi-hard shoulder means comprises a plastic insert within said end cap providing said shoulder adjacent to the interior end of said comating thread means on said end cap whereby, during said further longitudinal moving together of said end cap and said middle body, said comating thread means on said middle body self-taps into said plastic insert.

* * * * *